(12) United States Patent
Ovadia

(10) Patent No.: US 6,320,165 B1
(45) Date of Patent: Nov. 20, 2001

(54) IMPINGEMENT OVEN AIRFLOW DEVICES AND METHODS

(75) Inventor: David Z. Ovadia, Coppell, TX (US)

(73) Assignee: Pizza Hut, Inc., Dallas, TX (US)

( * ) Notice: Subject to any disclaimer, the term of this patent is extended or adjusted under 35 U.S.C. 154(b) by 0 days.

(21) Appl. No.: 09/533,434

(22) Filed: Mar. 23, 2000

Related U.S. Application Data

(60) Provisional application No. 60/125,811, filed on Mar. 23, 1999.

(51) Int. Cl.[7] ............................. A21B 1/26; A21B 1/48; F27B 9/24; F27D 7/04
(52) U.S. Cl. ........................... 219/400; 219/388; 99/476; 99/477; 126/21 A
(58) Field of Search ..................................... 219/400, 388; 99/386, 443 C, 474–477; 126/21 A; 34/219, 221, 226, 232, 233; 239/536, 548, 590.5

(56) References Cited

U.S. PATENT DOCUMENTS

| | | |
|---|---|---|
| 3,630,311 | 12/1971 | Nagamatsu . |
| 3,730,440 | 5/1973 | Parkison . |

(List continued on next page.)

FOREIGN PATENT DOCUMENTS

| | | |
|---|---|---|
| 914546 | 1/1963 | (GB) . |
| 985443 | 3/1965 | (GB) . |

OTHER PUBLICATIONS

Zumbrunnen et al., "Convective Heat Transfer Enhancement Due to Intermittency in an Impinging Jet", Journal of Heat Transfer, Feb. 1993, vol. 115, p. 91.

Sherif et al., "Effect of Flow Pulsations on the Cooling Effectiveness of an Impinging Jet", Transactions of the ASME, Nov., 1994, vol. 116, p. 886.

Ovadia, "Sonic–Enhanced Heat & Mass Transfer: Possible Appliation to Baking", Dept. of Grain Science & Industry, Kansas State University, Dec. 8, 1995.

Newbery, "Vacuum Cooling", American Society of Bakery Engineers, 72nd Annual Technical Conference, Mar. 5, 1996, p. 81.

Ovadia, et al., Opportunities for Impingement Technology in the Baking and Allied Industries (Part IV), American Institute of Baking Research Department Technical Bulletin, vol. XIX, Issue 5, May, 1997.

Huang et al, "Heat transfer and flow visualization experiments of swirling, multi–channel, and conventional impinging jets", Int. J. Heat Mass Transfer, vol. 41, No. 3, pp. 583–600, 1998.

Ovadia, et al., "Impingement in Food Processing", FoodTechnology, vol. 52, No. 4, Apr., 1998.

*Primary Examiner*—Joseph Pelham
(74) *Attorney, Agent, or Firm*—Dicke, Billig & Czaja, P.A.

(57) ABSTRACT

Embodiments of the present invention can be used in situations in which heat and mass-transfer modified product, such as individual-sized pizzas, are to be prepared in relatively short periods of time, for example in one to five minutes. Through structural design features and air manipulation, embodiments of the invention provide distinct advantages over the prior art, including improving quality control by increasing uniformity of heating across the oven and within each particular product, decreasing required baking time by increasing the effectiveness of impinging air jets through air pulsation and fluctuation, and maintaining uniformity of air flow to contact the baked product substantially perpendicular to its surface. Tubes or pipes possessing impingement nozzles permit the use of compressed air instead of fans. Embodiments of the invention permit more compact oven design, better control of air jet parameters, and quieter oven operation, and other advantages.

61 Claims, 12 Drawing Sheets

U.S. PATENT DOCUMENTS

| | | |
|---|---|---|
| 4,154,861 | 5/1979 | Smith . |
| 4,160,440 | 7/1979 | Barnickle . |
| 4,307,286 | 12/1981 | Guibert . |
| 4,462,383 | 7/1984 | Henke et al. . |
| 4,471,000 * | 9/1984 | Brown et al. ................. 219/400 |
| 4,569,658 | 2/1986 | Wiggins et al. . |
| 4,591,333 * | 5/1986 | Henke ................. 99/386 |
| 4,626,661 * | 12/1986 | Henke ................. 219/400 |
| 4,643,167 | 2/1987 | Brewer . |
| 4,835,351 | 5/1989 | Smith et al. . |
| 4,924,763 | 5/1990 | Bingham . |
| 4,951,648 * | 8/1990 | Shukla et al. ................. 126/21 A |
| 4,965,435 | 10/1990 | Smith et al. . |
| 5,129,384 | 7/1992 | Parks . |
| 5,205,274 | 4/1993 | Smith et al. . |
| 5,211,106 | 5/1993 | Lucke . |
| 5,231,920 | 8/1993 | Alden et al. . |
| 5,242,119 | 9/1993 | Jariyasunant . |
| 5,272,299 | 12/1993 | Ovadia . |
| 5,299,557 | 4/1994 | Braithwaite et al. . |
| 5,331,135 | 7/1994 | Ovadia . |
| 5,334,402 | 8/1994 | Ovadia . |
| 5,398,666 | 3/1995 | Smith et al. . |
| 5,401,940 | 3/1995 | Smith et al. . |
| 5,423,248 * | 6/1995 | Smith et al. ................. 99/443 C |
| 5,454,295 | 10/1995 | Cox et al. . |
| 5,601,070 | 2/1997 | Hotard et al. . |
| 5,676,044 | 10/1997 | Lara, Jr. . |
| 5,793,019 * | 8/1998 | Boyle et al. ................. 219/400 |
| 5,832,812 | 11/1998 | Wolfe et al. . |
| 6,049,066 * | 4/2000 | Wilson ................. 219/400 |

\* cited by examiner

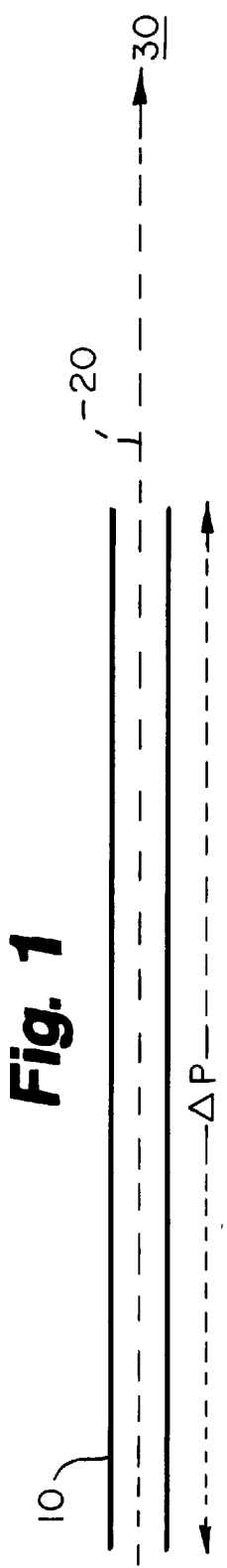
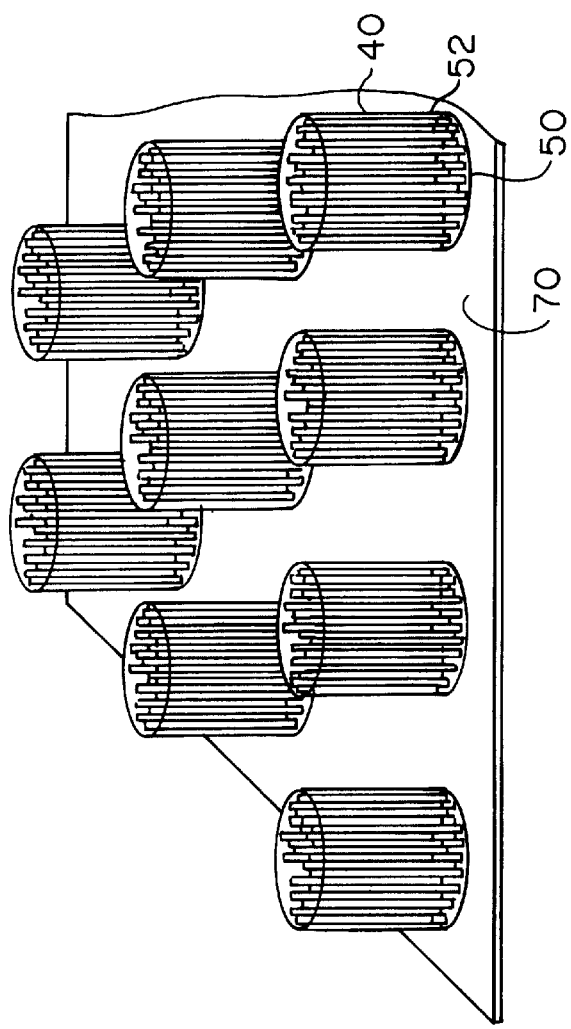
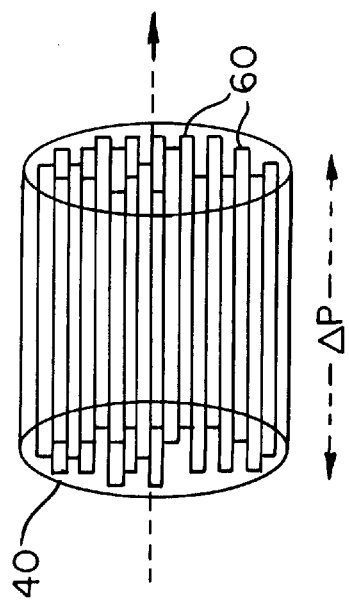

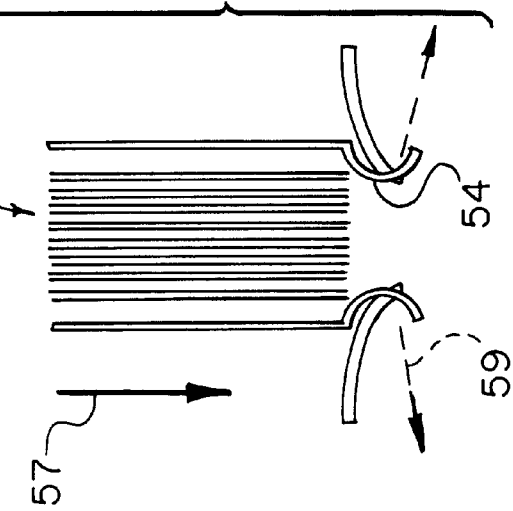
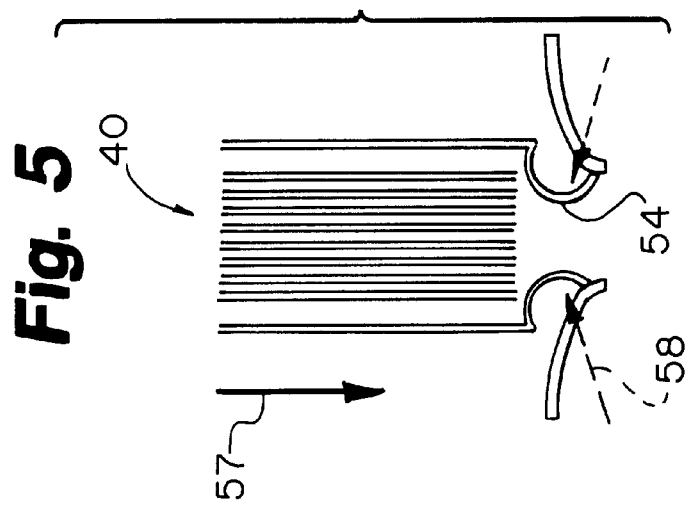
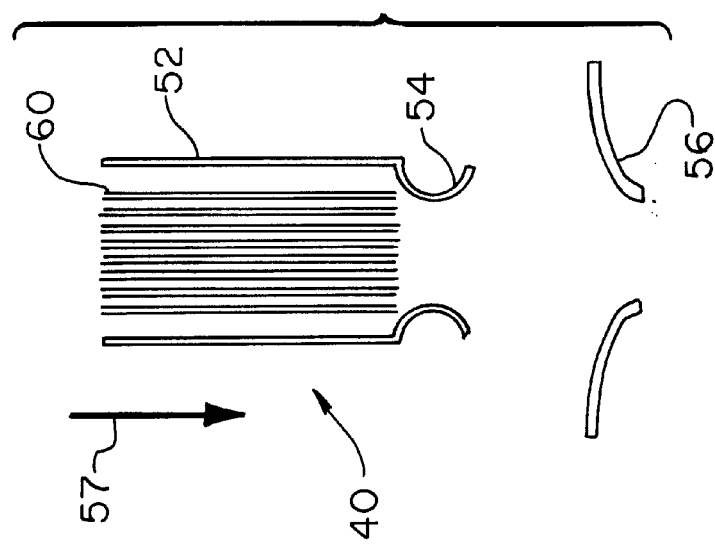

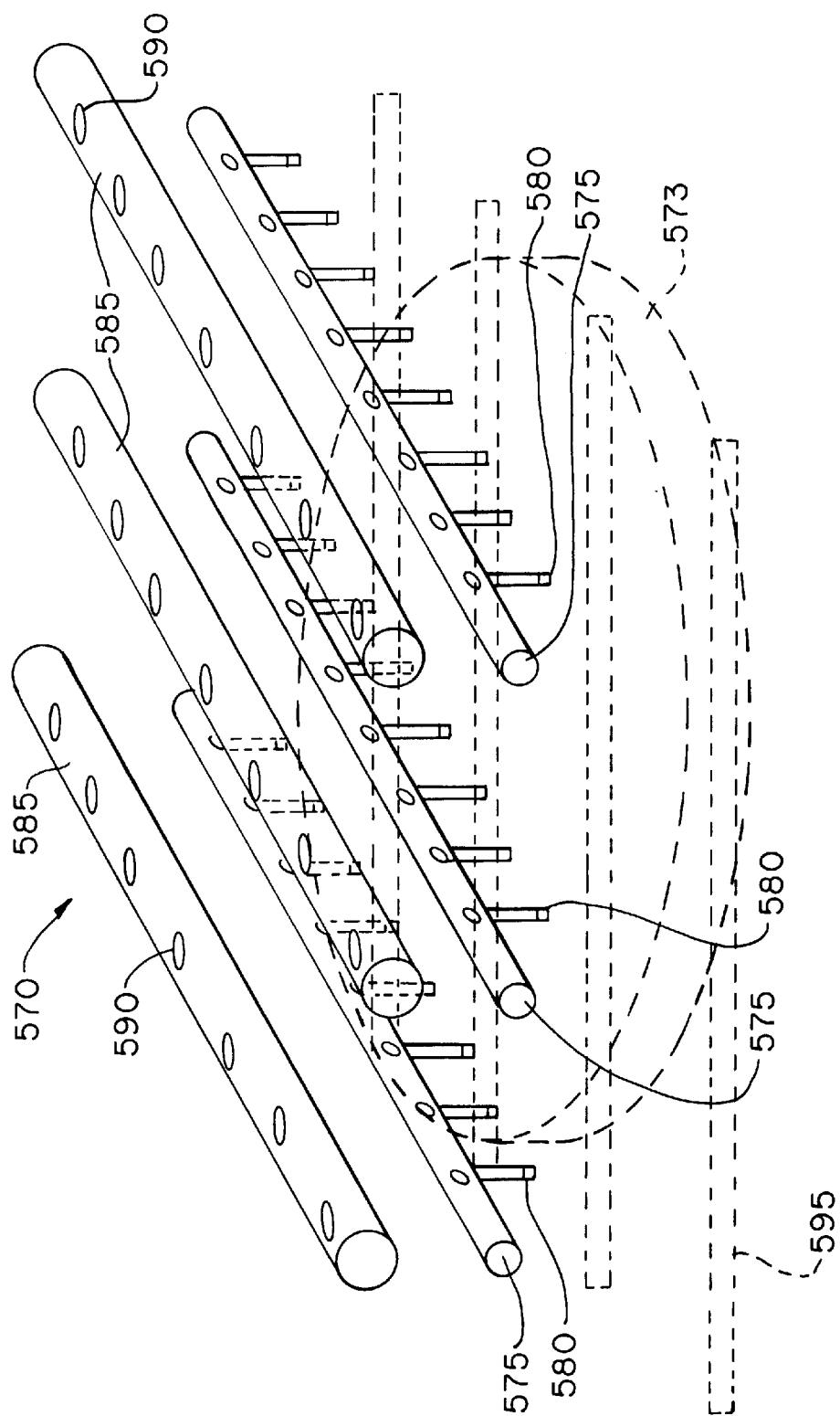

IMPINGEMENT OVEN AIRFLOW DEVICES AND METHODS

CROSS-REFERENCE TO RELATED APPLICATION

The subject matter of this application is related to the subject matter of commonly assigned, co-pending Application No. 60/125,811, filed Mar. 23, 1999, priority to which is claimed under 35 U.S.C. §119(e) and which is incorporated herein by reference.

BACKGROUND OF THE INVENTION

1. Field of the Invention

The invention relates generally to improving airflow in heat and mass transfer processes such as baking, freezing or drying and, more particularly, to improving impingement airflow by way of air fluctuation, increased airflow uniformity, and enhanced control of airflow. Embodiments of the invention are particularly applicable to use with ovens designed for baking pizza, especially restaurant ovens that can utilize the limited space available more efficiently and operate more quietly for a more compatible working environment.

2. Description of Related Art

Impingement processing that achieves heat and mass transfer modification of products is particularly attractive because impinging jets of air disrupt the layers of stagnant gas surrounding the surface of a product, thus increasing convection heat and mass transfer. The latter may also be increased by: vibration and pulsation of sound waves, rifling of air jets to be more cylindrical and less conical, rotating a jet about its axis, or swirling an air jet. See Huang, L. et al, "Heat Transfer and Flow Visualization Experiments of Swirling, Multi-Channel, and Conventional Impinging Jets," *Int. J. Heat Mass Transfer*, Vol. 41, No.3, pp.583–600 (1998), incorporated herein by reference, and placing a return air duct adjacent to air jet nozzles to make the jets more effective as described with respect to FIG. 1 of U.K. Patent No. 914,546, also incorporated herein by reference.

Many impingement ovens, for example, are hampered by a lack of uniformity of airflow due to design limitations. Nonuniform impingement airflow can cause irregularities within the oven, within baked products and between products being cooked at the same time. For example, the right-hand side of a pizza may be more baked than the left-hand side in some instances of nonuniform airflow, or identical raw pizzas may be baked to differing degrees in different zones of the same oven. Three important types of nonuniformity that adversely affect heat and mass transfer are: (1) differences in absolute air velocity at different nozzles due to irregular air flow into and out of the plenum chambers; (2) discharge of air from the nozzles in a nonperpendicular orientation to the surface of the heat and mass transfer modified product; and (3) tendency of the air jets to fan out into a widening cone more quickly than desired.

Past heat and mass transfer impingement devices have attempted to compensate for some of these deficiencies by passing air through long, thin, straight pipes which can impart a rifling effect to the discharged air. Air flowing through the pipes meets resistance to flow and experiences a pressure differential across the pipes. Expanding the pipe length aids in equilibrating the discharged air flowing from the pipes. Such processing equipment, however, tends to be very large and requires pipe lengths ranging from about 50–60 centimeters with pipe diameters of approximately two centimeters.

Impinging jets of gas in an oven can be expelled through nozzles in pipes through which gasflows under pressure, as described in U.K. Patent No. 985,443, incorporated herein by reference. Also, a high velocity jet of gas, so propelled, can be used to propel the flow of other gases by applying the Venturi effect, as exemplified by Newberry, Desmond, "Vacuum Cooling," in *Proceedings of $72^{nd}$ Annual Conference of the American Society of Bakery Engineers*, Chicago, Ill., pp. 81–86, (March 1996), incorporated herein by reference. In both cases, airflow can be quieter and better controlled than with the use of plenum chambers into which air is propelled with the help of large fans and large air-circulation chambers. This is because the propulsion of gas under pressure can be regulated more conveniently by the adjustment of a valve opening than by the modulation of fan speed, without the inherent complexities of aerodynamic airflow within large chambers and the noise of the fan and said airflow within said chambers. Accordingly, an impingement system that uses compressed air in pipes with nozzles, or uses air propelled by the Venturi mechanism, promises to be quieter, more compact, and more easily controlled than circulating air with fans into plenum chambers.

One particular shortcoming of the prior art that is addressed by embodiments of the invention is the inability to employ impingement processing more effectively in applications where it is desirable to cook a baked product, such as pizza, traveling through the oven on a conveyor belt within the limiting space constraints of a restaurant kitchen. Even in those instances where a conveyor belt is used, only a single rack per oven would be feasible because of the blocking that would occur between vertically spaced baked products in typical ovens. Examples of ovens utilizing single-layer conveyor belts for cooking can be found in Ovadia, David Z., et al., "Impingement in Food Processing," *Food Technology*, Vol. 52, No.4, pp. 46–50 (April 1998), incorporated herein by reference.

SUMMARY OF THE INVENTION

Embodiments of the present invention are contemplated for use in situations wherein heat and mass transfer modified product, such as individual-sized pizzas, are to be prepared in relatively short periods of time, for example in one to five minutes. Through e.g. structural design features and air manipulation, embodiments of the invention provide distinct advantages over the prior art, including improving quality control by increasing uniformity of heating across the oven and within each particular product, decreasing required baking time by increasing the effectiveness of impinging air jets through air pulsation and fluctuation, and maintaining uniformity of air flow to contact the baked product substantially perpendicular to its surface. Also, the use of tubes, or pipes possessing impingement nozzles described in the following, permits the use of compressed air instead of fans and the implementation of related advantages, permitting more compact oven design, better control of air jet parameters, and quieter oven operation, for example.

To overcome disadvantages of the prior art, embodiments of the invention utilize multiple short, thin, straight pipes to effect a columnar airflow which strikes perpendicularly to the surface of the heat and transfer modified product. The pipes are configured to achieve a predetermined ratio of length to diameter and desired pressure differentials across the respective pipes. A multiplicity of smaller adjacent pipes is used to facilitate a compact oven, while maintaining the appropriate length-to-diameter ratio necessary for the rifling of impinging jets. While said smaller pipes may be straight, they may also be spiraled to create swirled jet flow.

Alternatively, pipes of substantially equal total length are configured to effect heating wherein one or a set of the pipes are folded back upon themselves or otherwise configured to facilitate a compact-sized heat and mass transfer processing device, such as an oven.

In another embodiment, variations in air fluctuation are effected with a shutter, flap, or other mechanism used to alternately route air through airflow conduits to different plenums or areas within the processing chamber to improve and accelerate heat and mass transfer. In one embodiment, a solenoid is employed to alternately open and close two channels through which air is alternately directed. In a further embodiment, a low-frequency whistle mechanism is placed opposite the flow of air being channeled into the processing cavity, but proximal to the plenums or other areas within the processing chamber to create low-frequency air vibration, thereby causing increased fluctuation in the airflow.

Although embodiments of the invention are especially well-suited to preparation of individual-sized pizzas, the invention is not limited to these embodiments. Larger pizzas, other pizza-type and pizza-related food products, and other food and non-food products (e.g., drying paper, textiles, wood and curing electronic circuit boards, etc.) also can be prepared according to embodiments of the invention.

More specifically, a nozzle insert according to an embodiment of the invention is for an impingement oven, the nozzle insert comprising an outer shell, connection structure, operably coupleable with the outer shell, constructed to position the nozzle insert to direct gasflow toward a processing chamber of an impingement oven, and a plurality of conduits disposed within the outer shell, the plurality of conduits being constructed to create a rifling effect on gasflow passing through the plurality of conduits, thereby creating a plurality of gas jets for impinging on a product in the processing chamber. The outer shell is generally cylindrical, according to one embodiment, and the plurality of conduits comprises a plurality of generally cylindrical tubes. The connection structure can be constructed to removably connect the nozzle insert in position within the oven.

According to one embodiment, the outer shell has an overall length of between about 2 cm and about 5 cm, and the plurality of conduits each have a diameter of between about 0.1 and 0.2 cm. The nozzle insert preferably creates a pressure differential between a processing-chamber end thereof and an opposite end thereof, the pressure differential being generally the same as that created by a single conduit having a length up to about 12 times longer than the outer shell and having a diameter up to about 10 times the diameter of the plurality of conduits.

The connection structure is constructed to removably connect the nozzle insert to a nozzle of the impingement oven, according to one embodiment, and the plurality of conduits are generally straight and provide a generally linear gasflow path. Alternatively, the plurality of conduits can be generally curved and provide a generally spiral gasflow path. Further, according to one embodiment the connection structure is constructed to connect the nozzle insert to a plenum of the impingement oven.

According to an alternative embodiment of the invention, an impingement oven includes a processing chamber and a plurality of nozzle inserts positioned to direct gasflow to the processing chamber, each nozzle insert comprising an outer shell, connection structure, operably coupleable with the outer shell, constructed to position the nozzle insert to direct gasflow toward the processing chamber of the impingement oven, and a plurality of conduits disposed within the outer shell, the plurality of conduits being constructed to create a rifling effect on gasflow passing through the plurality of conduits, thereby creating a plurality of gas jets for impinging on a product in the processing chamber.

According to an alternative embodiment of the invention, an impingement oven comprises a source of gas and a plurality of conduits constructed to direct heated gas from the source to a processing chamber within the oven, the plurality of conduits further being constructed to direct impinging gas to a product within the processing chamber, the plurality of conduits terminating at the processing chamber at different distances from the source; the plurality of conduits each having generally the same length. At least one of the conduits can fold back on itself between the source and the processing chamber. The impingement oven can further comprise a plurality of return conduits constructed to direct return gas from the processing chamber to the source, the return conduits originating at the processing chamber at different distances from the source, the return conduits each having generally the same length. At least one of the return conduits can fold back on itself between the processing chamber and the source.

The impingement oven can further include at least one nozzle insert, in fluid communication with at least one of the conduits, the at least one nozzle insert being positioned to direct gasflow to the processing chamber, the at least one nozzle insert comprising, an outer shell, connection structure, operably coupleable with the outer shell, constructed to position the nozzle insert to direct gasflow toward the processing chamber of the impingement oven, and a plurality of subconduits disposed within the outer shell, the plurality of subconduits being constructed to create a rifling effect on gasflow passing through the plurality of subconduits, thereby creating a plurality of gas jets for impinging on the product within the processing chamber.

According to an alternative embodiment, an impingement oven comprises a processing chamber, first structure at the processing chamber for directing impinging gas to a product in the processing chamber, second structure at the processing chamber for directing impinging gas to the product in the processing chamber, a gas source in fluid communication with the first and second structures, conduits for directing gas from the gas source to the first structure and the second structure and a gas fluctuation device, operably coupled with the conduits, for alternately channeling gas either to the first structure or to the second structure.

The first structure can comprise a plurality of nozzles of the impingement oven, and the plurality of nozzles can be a plurality of first nozzles. The second structure can comprise a plurality of second nozzles of the impingement oven, wherein the second nozzles are disposed on an opposite side of the processing chamber from the first nozzles.

The first structure comprises a plenum plate of the impingement oven, according to one embodiment, and the second structure comprises the plenum plate or an additional plenum plate of the impingement oven. The first structure can comprise a plurality of first nozzles and the second structure a plurality of second nozzles, the first nozzles being interspersed with the second nozzles.

The first and/or second structure comprises at least one nozzle insert, according to one embodiment, in fluid communication with at least one of the conduits, the at least one nozzle insert being positioned to direct gasflow to the processing chamber, the at least one nozzle insert comprising an outer shell, connection structure, operably coupleable with the outer shell, constructed to position the nozzle insert to direct gasflow toward the processing chamber of the impingement oven, and a plurality of subconduits disposed within the outer shell, the plurality of subconduits being constructed to create a rifling effect on gasflow passing through the plurality of subconduits, thereby creating a plurality of gas jets for impinging on the product within the processing chamber.

The gas source can comprise a source of compressed air, and the gas fluctuation device can comprise a shutter, the shutter moving to a first position to direct gas to the first structure and moving to a second position to direct gas to the second structure. The shutter can comprise a pivoted flap, and can define at least one aperture therethrough for allowing gas to flow alternately to the first structure and the second structure. The shutter can define a generally circular shape and define a plurality of apertures disposed therethrough, and the oven further can comprise a shutter plate operably connected to the shutter, rotation of the shutter plate with respect to the shutter allowing gas to flow through the apertures alternately to the first structure and the second structure. The shutter is constructed for linear movement between the first and second positions, according to one embodiment.

The gas fluctuation device also can comprise at least one reciprocating piston in fluid communication with at least one of the conduits. The conduits can comprise a first conduit in fluid communication with the first structure and a second conduit in fluid communication with the second structure, and the gas fluctuation device can comprise a first reciprocating piston in fluid communication with the first conduit, and a second reciprocating piston in fluid communication with the second conduit. The first and second structure can comprise a plurality of nozzles. The oven further can comprise a plurality of valves, in fluid communication with the first and second conduits, for aiding the gas fluctuation device.

The conduits comprise at least one first conduit constructed to direct gas from the source toward the processing chamber, according to one embodiment, and at least one second conduit constructed to direct gas from the processing chamber toward the source. The gas fluctuation device reverses gasflow within the oven such that the first conduit also directs gas from the processing chamber toward the source and such that the second conduit also directs gas from the source toward the processing chamber. The conduits terminate at the processing chamber at different distances from the source, according to one embodiment; the plurality of conduits each having generally the same length. Additionally, structure for producing low-frequency vibration also can be provided.

According to another embodiment of the invention, an impingement oven comprises a processing chamber, first means at the processing chamber for directing impinging gas to a product in the processing chamber, second means at the processing chamber for directing impinging gas to the product in the processing chamber, means for providing a source of gas, means for directing gas from the means for providing to the first means and the second means, and means for alternately channeling gas either to the first means or to the second means.

According to another embodiment of the invention, an impingement oven comprises a processing chamber, a gas source, an input channel for directing gas from the source toward the processing chamber, and a return channel for directing gas from the processing chamber toward the source, wherein at least one of the input channel and the output channel are constructed to support a product to be processed by the oven in the processing chamber. The processing chamber is constructed to accommodate multiple products top-to-bottom within the processing chamber, according to one embodiment, and the oven further comprises multiple input channels disposed directly above and directly below each product within the processing chamber. The product can be supported on the output channel.

The oven further can comprise structure to reverse the flow of gas in the input channel and the output channel, such that the input channel directs gas from the processing chamber toward the source and the return channel directs gas from the source toward the processing chamber. The gas source can comprise a compressed gas source, and the structure to reverse can comprise at least one valve associated with the compressed gas source.

According to another embodiment of the invention, an impingement oven comprises a processing chamber for accommodating a product to be processed by the oven, a gas source, an input channel for directing gas from the source toward the processing chamber, and a return channel for directing gas from the processing chamber toward the source, the input channel and the return channel comprising tubes disposed within the processing chamber in direct association with the product.

The oven can comprise structure to reverse the flow of gas in the input channel and the output channel, such that the input channel directs gas from the processing chamber toward the source and the return channel directs gas from the source toward the processing chamber. The input channel can comprise at least one nozzle aimed toward the product for directing gas toward the product, and the return channel can comprise at least one aperture aimed away from the product for receiving return air from the processing chamber.

Both the input channel and the return channel are disposed above the product, according to one embodiment, and the input channel can be disposed below the product and comprise at least one nozzle aimed away from the product. A second input channel can be disposed above the product, the second input channel comprising at least one nozzle aimed toward the product. A rebound plate for receiving and reflecting gas received from the at least one nozzle can also be provided. The gas source can be a compressed gas source.

The input channel can comprise at least one nozzle, and the oven further can comprise a heating element disposed around the at least one nozzle for improving heat transfer within the oven. The heating element can comprise an electric coil or an infrared heating element, for example.

The oven can comprise two input channels disposed within the processing chamber for directing gas toward the product at different distances from the source, and the two input channels can each have generally the same length. One of the input channels folds back upon itself, according to one embodiment, and at least one of the input channel and the return channel contacts the product.

Other features and advantages of the invention will be apparent from the following description and claims.

BRIEF DESCRIPTION OF THE DRAWINGS

Embodiments of the invention will be described with respect to the figures, in which like reference numerals denote like elements, and in which:

FIG. 1 shows a typical rifled nozzle.

FIGS. 2–3 show an embodiment of the invention utilizing a pipe configuration to improve impingement airflow.

FIGS. 4–6 show insertion of the FIG. 2 embodiment into an existing nozzle according to an embodiment of the invention.

FIG. 17 shows an embodiment of the invention utilizing baking racks and impingement heating.

DETAILED DESCRIPTION OF PREFERRED EMBODIMENTS

Figure 9:
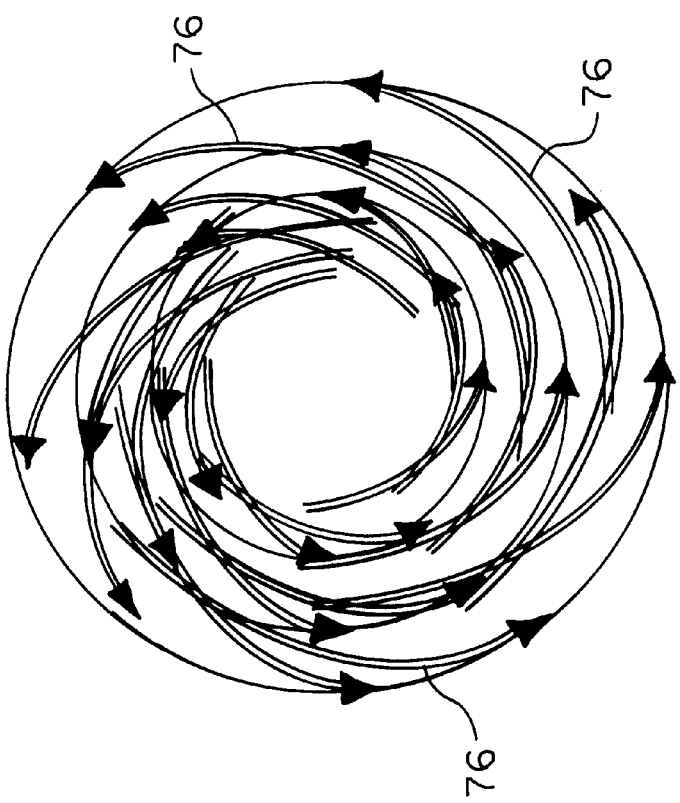
FIGS. 8–9 show airflow paths according to an alternative embodiment.

Embodiments of the invention provide devices and methods for improving impingement airflow in baking ovens by manipulation of the design and/or structure of heating conduits, piping and/or air nozzles, and/or or by utilization of air fluctuation techniques and designs. Embodiments of the invention are designed: (1) to equalize air speed from different nozzles into and out of the plenums or other chambers of an oven, (2) to ensure the maintenance of a substantially perpendicular orientation between the propelled jets of air from the nozzles and the surface of the baked good being heated, (3) to maintain columnar, as opposed to conical, bursts of air, (4) to generally improve heat and mass transfer and accelerate baking and other heat and mass transfer processes, (5) to make ovens more compact where space available for them is limited, and (6) to make oven operation quieter for a more compatible work environment. It is contemplated by the invention that different embodiments herein may be utilized in combination with one another to achieve and improve upon any of the above-stated objectives.

Referring to FIG. 1, it is known in the art to pass air through long pipes 10 having a proportionately sized diameter to create a "rifling effect" of air 20 into heating chamber 30, that is, to create more perpendicular and columnar air flow. Such systems, however, require extensively sized ovens due to the overall dimensions (sometimes exceeding 60 centimeters in length and about 1.5 or 2 centimeters in diameter) of the heating conduits/pipes 10. According to embodiments of the invention, on the other hand, effective pipe length is substantially reduced.

Referring to FIGS. 2–3, one such embodiment is depicted that is particularly, though not exclusively, useful in retrofit applications to nozzles in existing ovens. Nozzle inserts 40 are clipped, snapped, screwed, inserted, force-fit or otherwise placed in association with existing holes or nozzles 50 of an oven. The term "insert" should not be interpreted as limited to a retrofit application; use by original equipment manufacturers is contemplated as well, for example. Inserts 40 disperse and distribute heated air into plenums of an associated oven, or directly into heating chambers thereof.

As shown in FIGS. 4–6, inserts 40 can be snapped into or otherwise placed in association with existing oven nozzles having a defined shape. Composite nozzle insert 40 includes a generally cylindrical outer shell 52 to which is secured insertion clip 54. As clip 54 approaches and engages existing plenum nozzle 56, as indicated by arrow 57, nozzle 56 flexes clip 54 inwardly, as at 58. As shown, nozzle 56 can be considered to be a part of the plenum plate itself. As insertion is completed, clip 54 snaps or otherwise flexes back outwardly to its original position, as at 59 in FIG. 6, to lock composite nozzle insert 40 into place.

A multiplicity of much smaller conduits or tubules 60, having a length of e.g. about 5 centimeters and a diameter of about 2 millimeters, are disposed within inserts 40. Of course, other dimensions, such as a length of about 2 centimeters, for example, are contemplated according to the invention. Conduits 60 are together contained within a larger insert 40, and together can create the same general pressure differential $\Delta P$ as the typical rifled nozzle of FIG. 1, but in a fraction of the length thereof. In effect, then, the multiplicity of smaller tubules or conduits 60 inserted within each nozzle comprise a compound or composite nozzle, thereby allowing for sufficient airflow to satisfy the above-mentioned and/or other objectives.

According to embodiments of the invention, the ratio of pipe length to diameter is optimized to facilitate the "rifling effect" when air is directed out of the nozzle, thereby maintaining a generally columnar arrangement to generally perpendicularly strike the surface of the baked good. Use of the appropriate ratio of length to diameter is necessary to create optimal flow of air jets toward the baked product. The striking of the surface of the baked product generally perpendicularly brushes away the stagnant layer of cooler gases residing at and/or near the surface. Engagement of the impinged air at a generally perpendicular orientation with the surface of the baked product is very important for optimal increase in heating and drying effects. If a generally perpendicular orientation is not maintained, the stagnant gas is not dispersed as well.

Figure 8:
Figure 7:
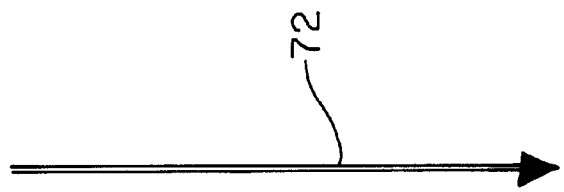
FIG. 7 shows an airflow path according to the FIG. 2 embodiment.

Small tubes 60 within each nozzle insert 40 are generally straight, in the previously described embodiments, and generally perpendicular to plenum plate 70. Note airflow path 72 in the side view of FIG. 7. In another embodiment of this invention, the small tubes may have a spiral formation, with the central axis of the spiral perpendicular to the plenum plate and/or baked product, consistent with airflow path 74 in the side view of FIG. 8. This embodiment enables the air jets to be swirled, with the inherent advantages of improved heat and mass transfer and uniformity thereof. As shown in the top view of FIG. 9, the multiple spiral tubules of a composite nozzle insert according to this embodiment impart angular momentum to multiple air jets, providing multiple swirled airflow paths 76. Of course, inserts 40 can be attached to one or more plenum plates within a particular oven or oven arrangement, with either the swirled or straight-line nozzle insert embodiment. Additionally, if desired, the number and/or pattern of holes or nozzles 50, 56 receiving inserts 40 can be varied, to create desired air flow characteristics, and both straight-line and swirled inserts can be used on the same plenum or in the same oven, as may be desired.

Figure 10:
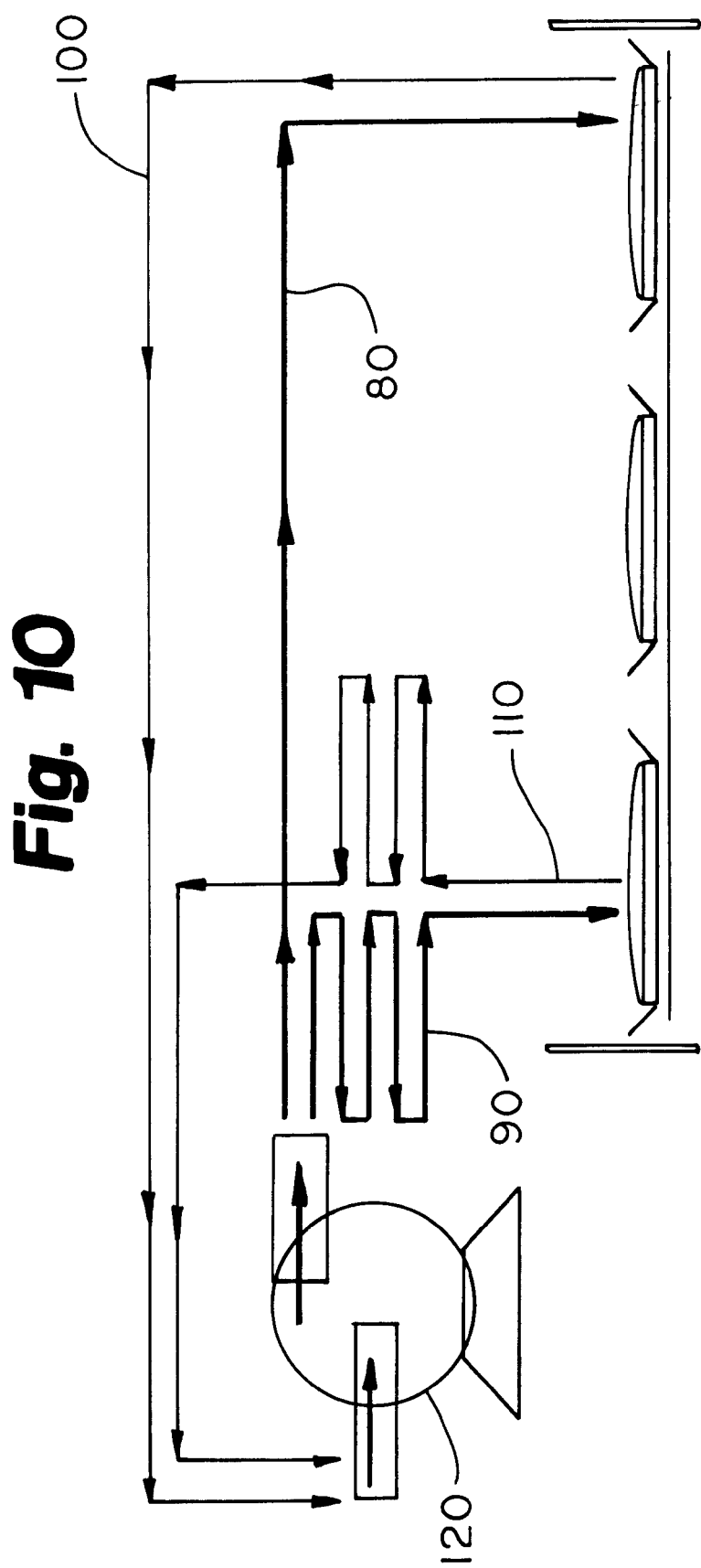
FIG. 10 shows an embodiment of the invention utilizing an alternative pipe configuration to improve impingement airflow.

In a further embodiment, the invention contemplates the use of two or more heating pipes or ducts which have different configurations but which are of substantially the same overall length. As shown in FIG. 10, for example, one pipe represented schematically at 80 forms a generally L-shaped conduit while a second pipe represented schematically at 90 continually folds back against itself. Return air flow, illustrated schematically at 100, 110, is generally parallel to flow within pipes 80, 90. As shown, both pipes 80, 90 have substantially the same overall length from gas propulsion mechanism 120, such as a compressed air source, fan and/or gas propelled by the Venturi effect, to the exit of the nozzle. The pressure differential from mechanism 120 to the exit of each nozzle is the same for each of pipes 80, 90. In other words, if A represents mechanism 120, B represents the end of pipe 90, and C represents the end of pipe 80, then $P_A-P_B=P_A-P_C$. Additionally, portions, e.g. generally equal portions, at the distal ends of each pipe or set of pipes, for example the last 10 centimeters or so, are arranged generally perpendicularly to the surface of the baked good to ensure the desired columnar air configuration and to achieve the desired heating effects attendant with impingement. Such an apparatus is particularly useful for new designs or redesigns of ovens.

While FIG. 10 and the above description discuss the use of two pipes 80, 90, it should be understood that other numbers of pipes may be used to effect the desired heating, limited only by e.g. the size of the oven. Because all of the pipes are of generally the same length, the pressure drop across the pipes is substantially the same, as with the FIG. 10 embodiment. Accordingly, velocity of the impinged air exiting the nozzles is also substantially the same. Similar ducts or piping are present within the oven to facilitate return of air to the heater and the gas propulsion system. Exit orifices in the return air ducts should be spaced properly to encourage perpendicularity of air flowing out of the nozzles to the baked good. For example, use of multiple return air ducts would help to maintain pressure uniformity across the exit or return pipe orifices, as well as within the plenum. Conversely, utilization of too few return conduits or orifices would increase the pressure drop across the respective nozzles, thus affecting pressure within the plenum and causing nonuniform airflow. This nonuniformity will affect not only the return airflow out of different zones of the oven cavity, but likewise the ability of air flowing out of the nozzles into the oven cavity to strike the surface of the baked good at a perpendicular orientation and at uniform air speed, thus decreasing the desired uniformity of heat and mass transfer effects of impingement. As such, embodiments of the invention are utilized both for input and outtake of heated air to best improve heat and mass transfer efficiency on a system-wide basis.

In other embodiments of the invention, oven air flow conduits leading into the processing chamber are designed to utilize air fluctuation techniques to improve heat and mass transfer and additionally to accelerate, for example, baking of a product. Such utilization of air fluctuation techniques results in a marked improvement over the continuous flow of air typically used in impingement processing chambers. Air fluctuation results in marked improvement as a result of alternately channeling air into different conduits resulting in interruptions in airflow at different locations within the processing chamber. For example, if a first conduit supplies heated or cooled air to an upper plenum and a second conduit supplies heated or cooled air to a lower plenum of the processing chamber, a valve or other shutoff mechanism is utilized to channel the entirety of airflow first into one and then into the other conduit in an alternating fashion. Such manipulation of airflow will result in discrete bursts of air coming alternately from the upper and then the lower plenum into the impingement processing chamber. The result will be improved removal of the aforementioned layers of heat and mass transfer stagnant gases at the surface of the modified product.

Figure 11:
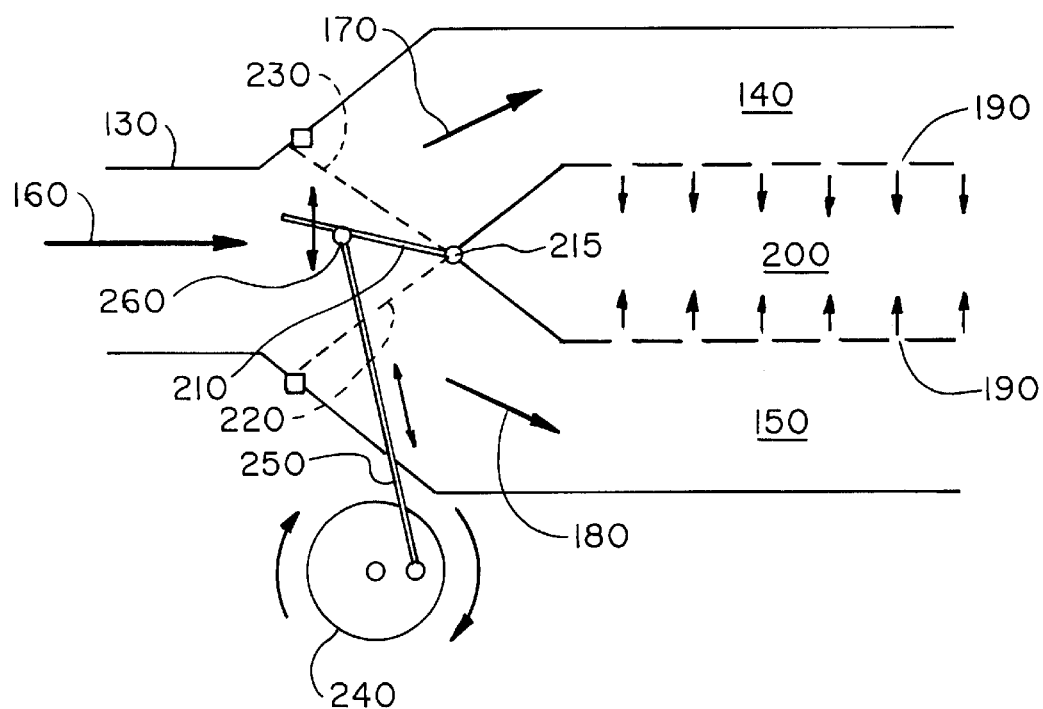
FIG. 11 shows an embodiment of the invention utilizing air fluctuation to improve baking characteristics.

In one embodiment, as depicted in FIG. 11, heating conduit or conduits 130 are separated to travel to top plenum 140 and base plenum 150. As shown, air flow 160 is alternately directed completely into either top plenum 140, as shown at 170, or base plenum 150, as shown at 180, and then ultimately expressed through impinging jet holes or nozzles 190 into impingement baking or processing chamber 200. Flap or other blocking device 210 is utilized to alternately block the respective plenums 140, 150. As shown herein, flap 210 oscillates up and down about pivot 215 between positions 220 and 230, at a predetermined frequency, to optimize the improved heating. Oscillation may be caused by rotating disk 240 attached to rod or cam 250 at pivot 260, by a solenoid, or by any other suitable means of moving the flap. Impingement is improved by airflow fluctuation caused by the illustrated mechanism.

This particular embodiment is advantageous in that it can be readily adapted to many existing ovens without requiring much alteration, as flaps are presently positioned in many ovens. The existing flaps, however, are typically fixed at a given setting and are adjusted by a screw or other similar means, thereby being incapable of alternating back and forth between partially or completely closed and open positions during the heating/baking process, as hereinabove described.

Maximum air velocity is increased according to this embodiment because, at two stages of each cycle, as depicted at positions 220 and 230 in FIG. 11, the entire airflow is diverted to only one of plenums 140, 150. Such diversion of air is typically not practiced in ovens of the prior art. It is further understood that during portions of each cycle, air is directed into both plenums 140, 150. Because increasing air velocity increases heating in impingement ovens, the design as depicted in FIG. 11 seeks to optimize impingement heating. Flap 210 may continually move between positions 220 and 230 or, alternatively, may be programmed to momentarily stop at respective positions 220, 230 or at any point or points along its path of travel between positions 220, 230. Microprocessor or other control is contemplated.

Figure 12:
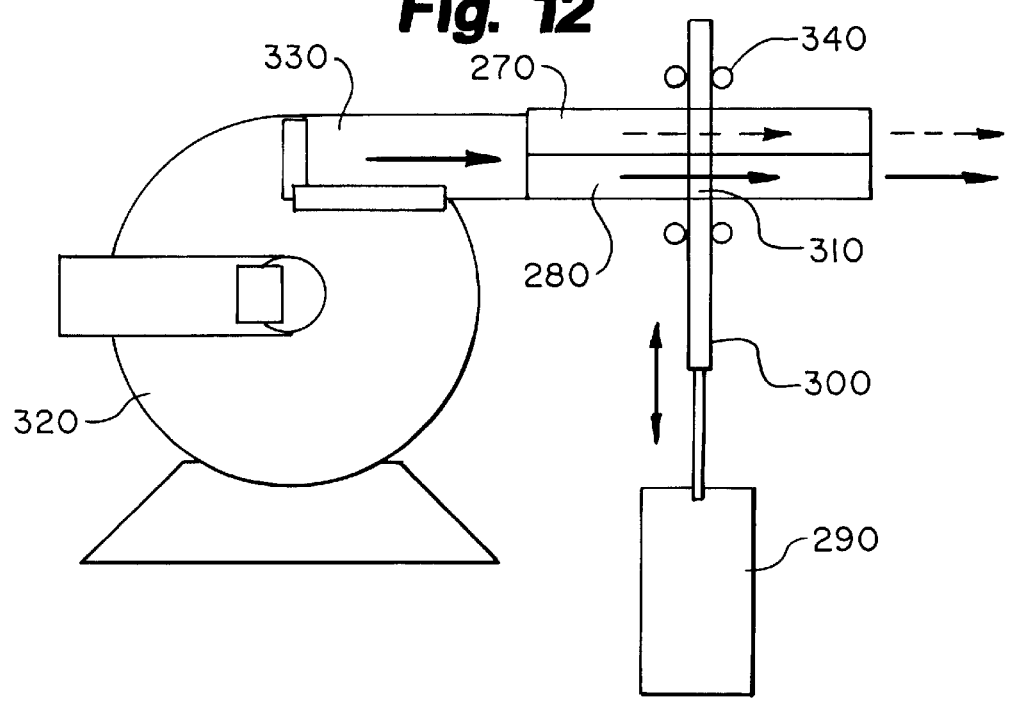
FIG. 12 shows an alternative embodiment of the invention utilizing air fluctuation to improve baking characteristics.

As shown in FIG. 12, a further embodiment of the invention contemplates the use of two or more channels 270, 280 positioned in a substantially parallel and adjacent manner. With the use of solenoid 290, or other means of effecting movement, shutter 300 having at least one opening 310 is moved across or through the channels. Shutter 300 effectively blocks airflow through the channels except when the one or more shutter openings 310 are positioned across the particular corresponding channel or channels. Utilization of shutter 300 results in fluctuation of air alternately through each channel 270, 280 into respective top and base plenums of an oven, for example. One or more of the channels can be directed toward the top plenum, while the remaining channels can be directed toward a base plenum. Air fluctuation is effected by the constant up-and-down movement of solenoid 300 or other movement means, which continually allows air to pass into different conduits. This embodiment is particularly advantageous in that its design is compact and suitable for use over an extended period of time.

Thus, according to the illustrated embodiment, air flows from source 320, such as an oven fan or compressed air source, into pre-channel area 330 and then into channels 270, 280. Shutter 300 can be mounted on rollers 340 or other suitable mechanisms to permit stable and generally unhindered movement. The generally constant or other movement of shutter 300 "fires" hot air alternatively into the top or base plenum by the up-and-down movement of solenoid 290 or by operation of an alternative mechanism.

Figure 13:
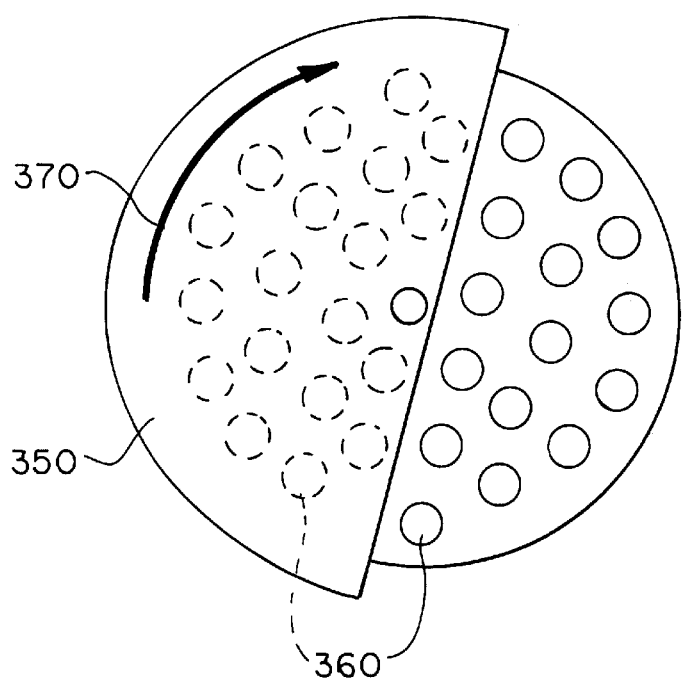
FIG. 13 shows an alternative embodiment of the invention utilizing air fluctuation to improve baking characteristics.

In a further embodiment of the invention, depicted in FIG. 13, air fluctuation is effected by a rotating shutter disk 350, preferably partially circular, semicircular or hemispherical in shape. Movement of shutter disk 350 is effected through any suitable means to alternately block portions of air channels 360 respectively directed toward a base plenum and a top plenum. In the illustrated embodiment, for example, air channels 360 illustrated in dashed lines are blocked by shutter disk 350 and are directed to e.g. a top plenum. Air channels 360 illustrated in solid lines are not blocked and are thus free to release impingement airflow, e.g. to a base plenum. As disk 350 rotates, as indicated by arrow 370, the distribution of blocked and open channels changes. Air channels 360 can be of a style similar to that previously described and depicted with respect to FIG. 10, or of a different style or configuration. Hence, any of the different embodiments of the invention may be combined to optimize heating effects, heat flow and pressure equalization throughout the oven system.

Figure 14:
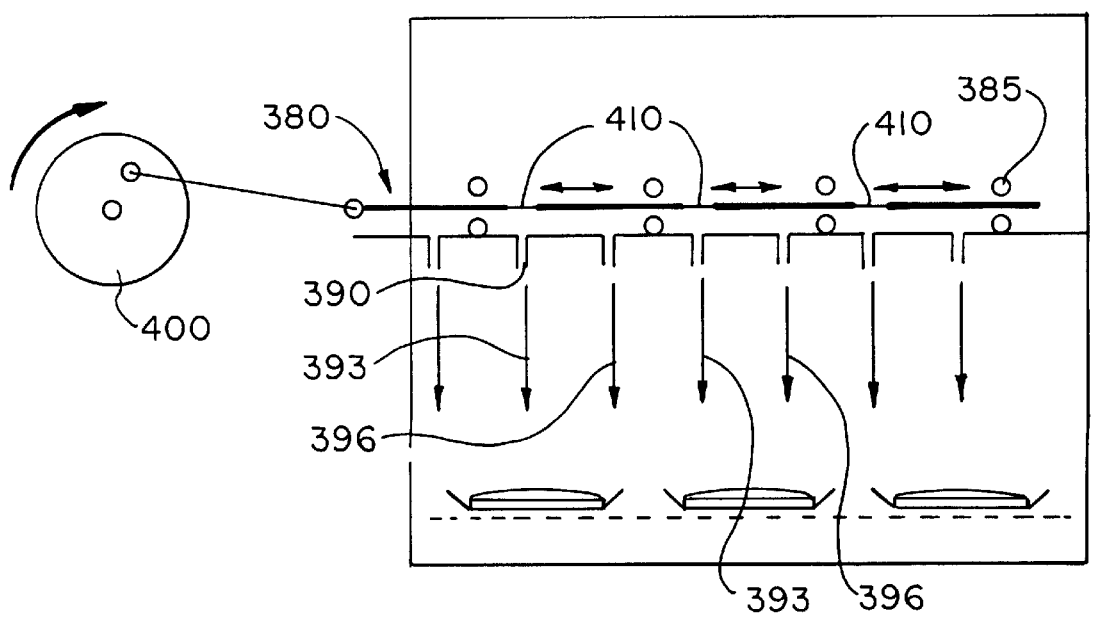
FIG. 14 shows an alternative embodiment of the invention utilizing air fluctuation to improve baking characteristics.

In a further embodiment of the invention, depicted in FIG. 14, an alternative means of effecting air fluctuation is shown. In this embodiment, shutter plate 380, or a series of connected shutter plates, oscillate back and forth on rollers 385 above (and/or below) impingement nozzles 390, thereby alternately blocking and opening the same to cause alternating impinging jets 393, 396. In one embodiment, shutter plate 380 is connected to rotating motor 400, which oscillates shutter plate 380. In operation, shutter plate 380 and rotating motor 400 function much like a piston in a motor. Again, due to the alternate opening and closing of air channels/nozzles 390, heat is directed to the respective base and top plenums of the oven to optimize air velocity, air flow, and the resulting effects of heat and mass transfer. Although only a top plenum is shown in FIG. 14, it will be understood that the illustrated mechanism also can be used in association with a base plenum, alone or simultaneously with the top plenum. As shown, shutter plate 380 may have multiple openings 410 which can be configured and designed with respect to associated nozzles to allow air to flow into the desired air channels going to top and/or base plenums.

Figure 15:
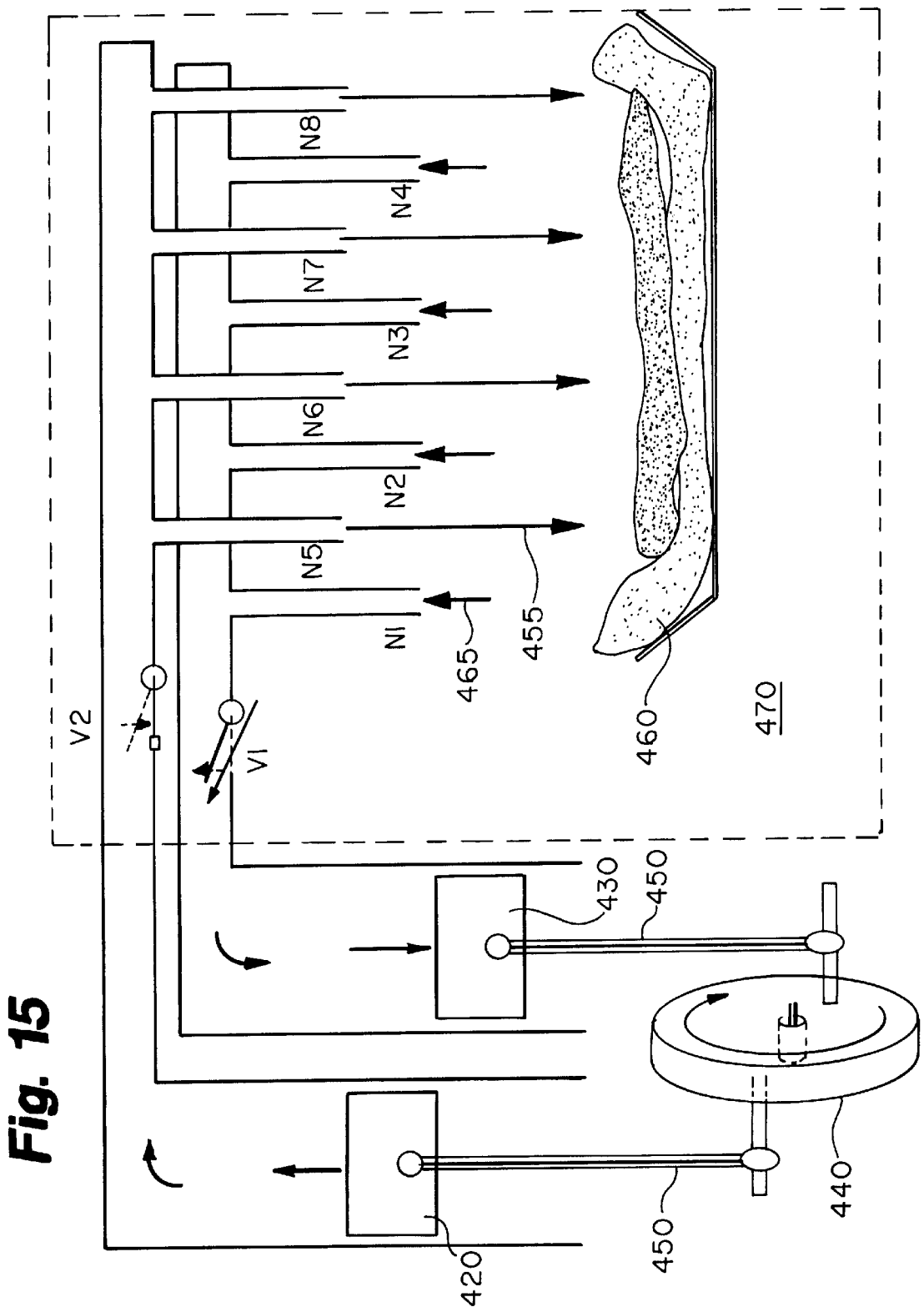
FIG. 15 shows an embodiment of the invention utilizing air fluctuation to improve baking characteristics.

In a further embodiment of the invention, depicted in FIG. 15, nozzles and return air ducts alternate their roles with the help of reciprocating pistons 420, 430 driven by wheel 440, itself driven by e.g. a motor, and connectors 450. With one stroke of piston 420, nozzles N5–N8 are inlet nozzles that inject air jets 455 onto processed item 460. Correspondingly, piston 430 moves opposite to piston 420 and removes air 465 from processing chamber 470, via nozzles N1–N4 which here function as return nozzles. With the second of a two-stroke process, the direction of movement of pistons 420, 430 reverses. The nozzles of the first stroke become return air nozzles, and the return air ducts of the first stroke become nozzles injecting air jets into processing chamber 470. For certain requirements, this may provide a preferred, compact embodiment of oven design and a more economic means of air jet fluctuation.

Thus, drive 440, here a wheel, raises one piston and lowers another piston simultaneously. During 180 degrees of its rotation (half of its 360 total degrees of rotation), air is expelled through jet nozzles N5–N8, and nozzles N1–N4 serve as return air ducts. During the second half, or, second 180 degrees, of rotation of the wheel, N1–N4 expel jets of air, and N5–N8 become return air ducts.

To further facilitate return airflow and reduce unnecessary strain on pistons 420, 430 and the wheel 440 that drives them, valve V1 opens when nozzles N1–N4 release return airflow, and valve V2 opens to help return airflow in conjunction with nozzles N5–N8. It is to be understood that FIG. 15, like other figures herein, is a simplified drawing that aims to provide an example and demonstrate a principle, and is not necessarily a blueprint for the precise mechanism that would be used according to the invention.

Figure 16:
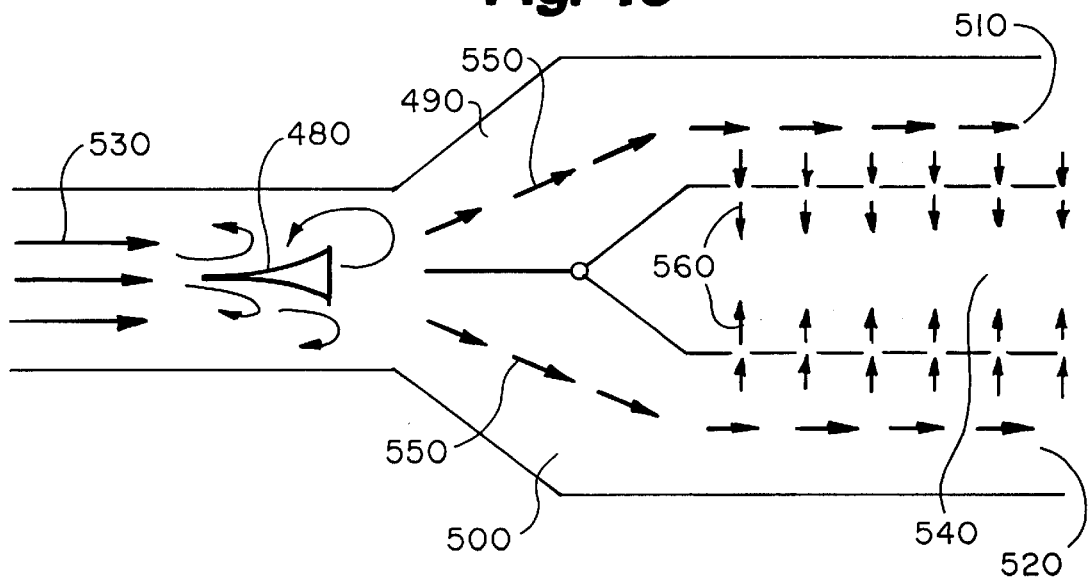
FIG. 16 shows an embodiment of the invention using low-frequency sound waves to cause air fluctuation.

In yet a further embodiment of the invention, shown in FIG. 16, a low-frequency whistle device 480 is placed in front of the heating fan prior to the branching of air channels 490, 500 to respective top and base plenums 510, 520. As air 530 is blown across whistle device 480, air flow fluctuation is created by low-frequency sound waves causing air vibration within plenums 510, 520. Air is then directed from the top and base plenums 510, 520 into impingement baking chamber 540 at other than a continuous flow. The fluctuation caused by the low-frequency vibration of the air, represented by arrows 550, 560, increases and decreases pressure at the surface of the baked good in chamber 540, thereby dispersing the stagnant gases by imploding and exploding, respectively, the stagnant layer and increasing heat and mass transfer. This embodiment as described may be used in combination with other embodiments described herein, e.g. with flap 210 previously described and shown with respect to FIG. 11, for example, to alternately direct air into respective top and base plenum portions of an oven.

In further embodiments of the invention, depicted in FIGS. 17 through 21, air conduits 570 comprise perforated hollow tubes which optionally function as racks within the oven on which baked product, such as pizza 573, is placed through door 574. These embodiments are particularly useful in ovens where two or more racks are desired, such as in ovens containing conveyor- or batch-type systems where it is desirable to position the racks above and beneath one another, respectively, to increase the load in a given oven capacity of fixed size. Air conduit network 570 preferably includes hollow, perforated tubes, or "flutes," and may be arranged alternately as input or impingement channels 575 with depending nozzles 580, and return channels 585 with perforations 590.

Additionally, the use of tubing instead of plenum chambers according to embodiments of the invention encourages the use of gas pressure, providing one or more of the following advantages or other advantages:

(a) more compact oven;

(b) quieter oven operation; and (c) greater control because all that needs to be controlled is a pressure valve associated with e.g. a compressed gas source, not fan speed and complex airflow in large chambers.

Figure 18:
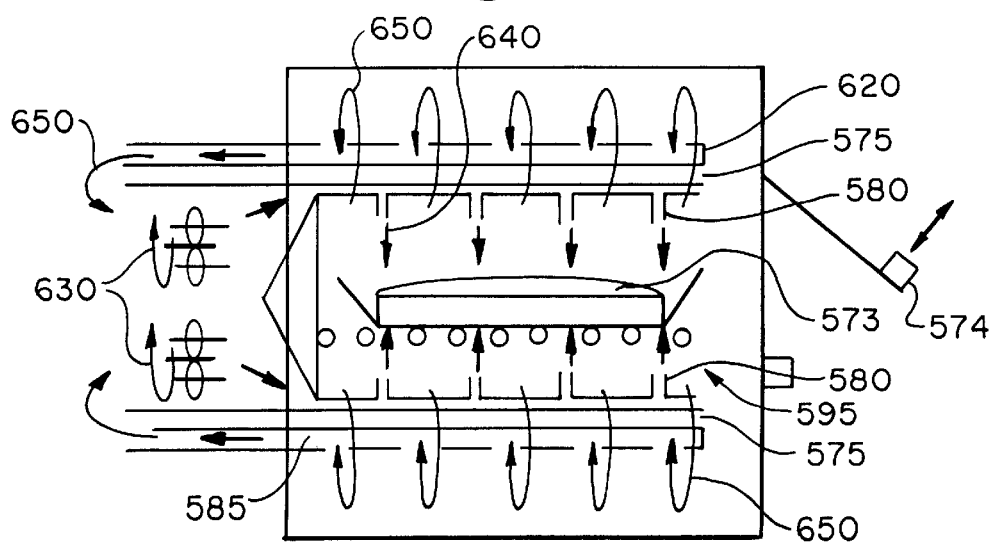
FIG. 18 is a side view of the embodiment depicted in FIG. 17.
Figure 19:
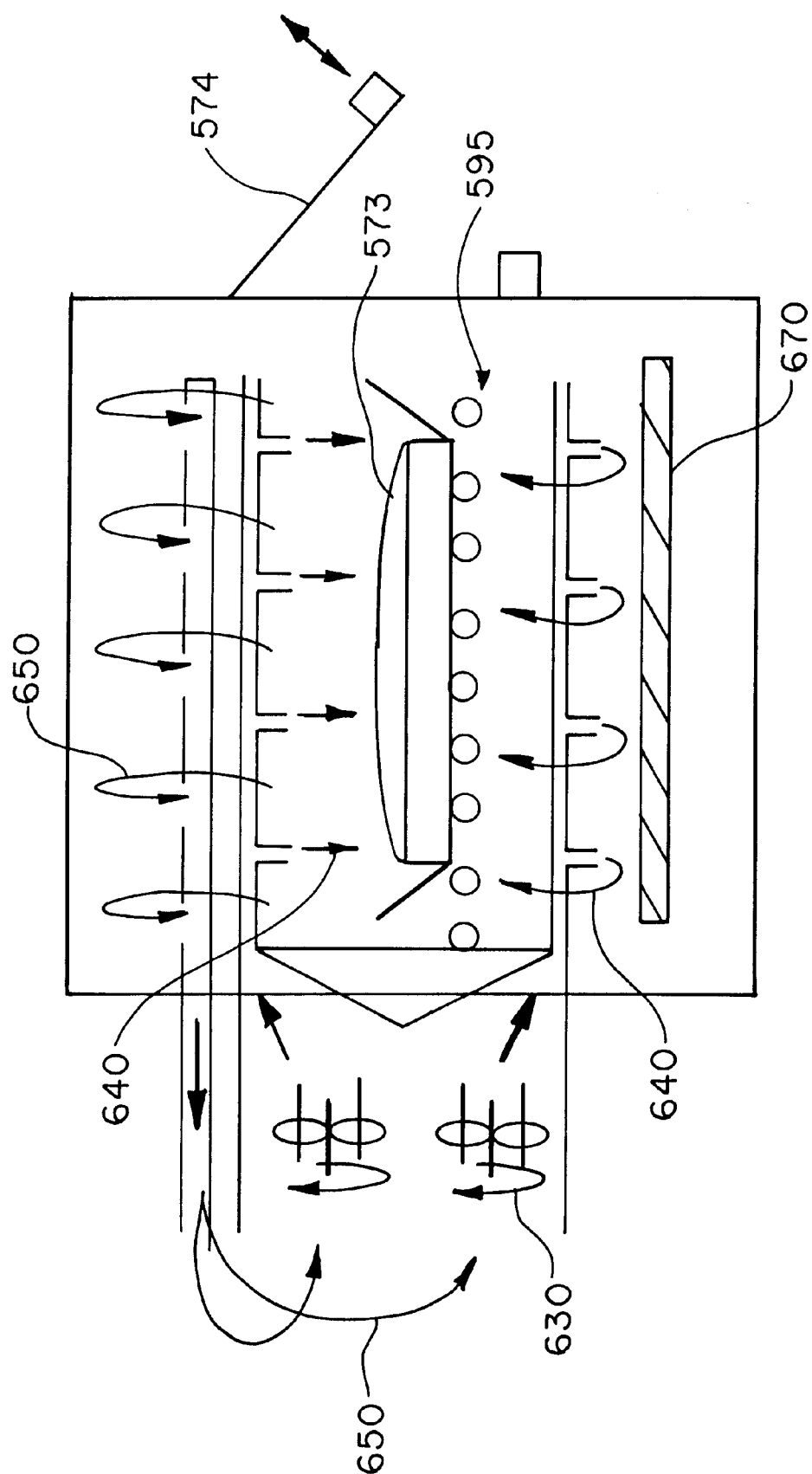
FIG. 19 is a view of the embodiment depicted in FIG. 17, utilizing an alternative method of redirecting impingement airflow.
Figure 21:
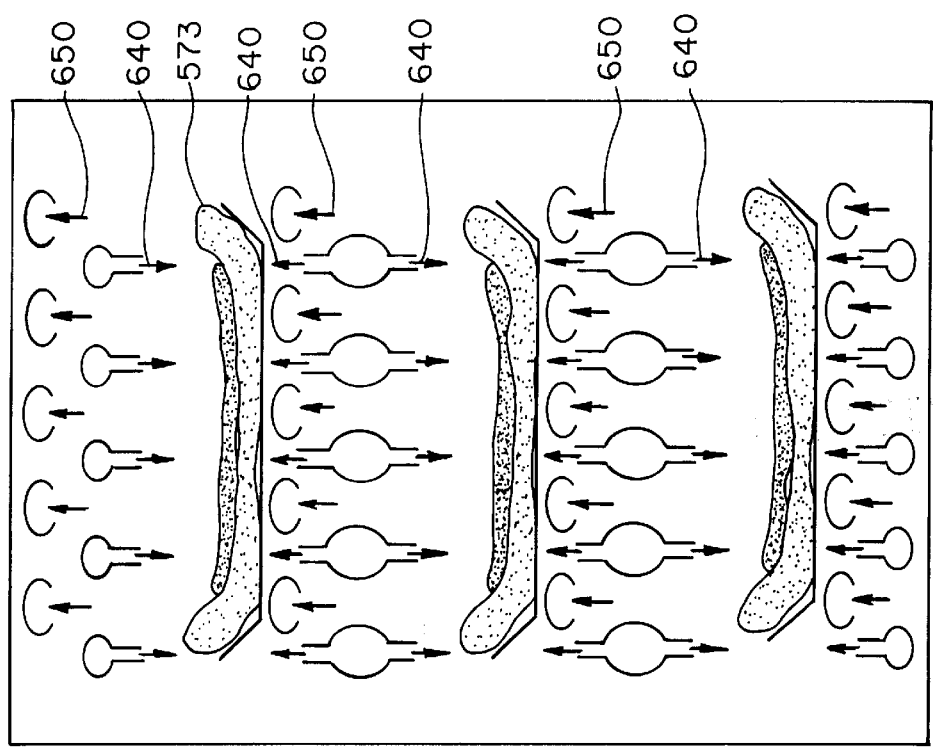
FIGS. 20–21 are side and end views, respectively, of an embodiment of the invention utilizing baking racks to effect impingement heating.
Figure 20:
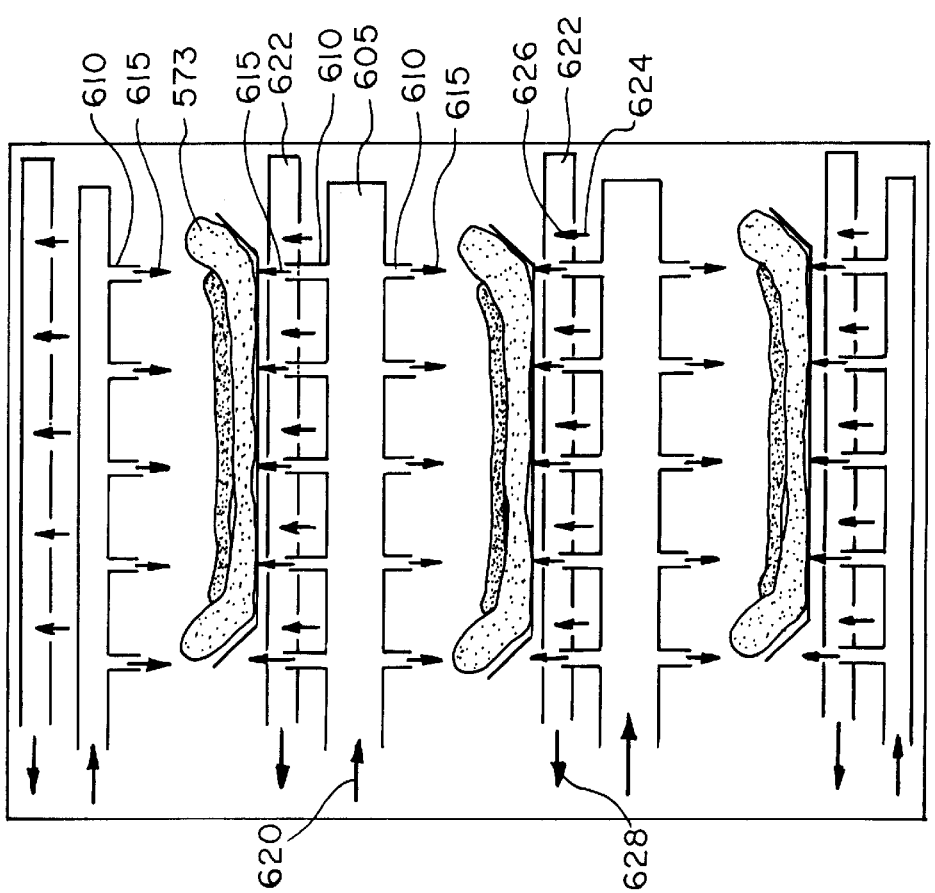

As shown in the embodiments of FIGS. 17–19, baked product 573 rests on rack 595, which is e.g. a typical metal rack forming a grid or other pattern. According to the embodiments of FIGS. 20–21, on the other hand, product 573 rests directly on one of the gas conduits forming flute network 600. Thus, input or impingement channel 605 according to this embodiment has both ascending and descending nozzles 610 for providing impingement jets 615 to multiple products 573, based on airflow 620. Return channels 622 include perforations 624 for receiving return airflow streams 626, which ultimately combine into return airflow streams 628. Product 573 rests directly on return channels 622, according to this embodiment.

With the embodiments of FIGS. 17–21, as well as with the other embodiments described in this application, it should be noted that the impingement and return air flutes or conduits can be formed a non-metallic substance such as silica, that not only can withstand the high temperatures of an impingement oven but also can be transparent to microwaves, radio waves, and other energy forms. Such transparency assures that the flutes or conduits will not reflect the microwave, radio wave or other energy, or otherwise render it less effective.

Also with the embodiments of FIGS. 17–21, a reciprocating piston can reverse the roles of the input/impingement conduits and the return conduits, e.g. on an oscillating two-cycle basis, in a manner akin to that described with respect to FIG. 15. Alternatively, one or more fans or compressed air sources 630 can be used to cause impingement air flow 640 and return air flow 650, generally illustrated in FIGS. 17–19 and 21.

Embodiments of the invention enable simultaneous impingement heating of baked products on more than one rack. With previous ovens, such heating is generally considered impossible because air is directed in through a top plenum and base plenum, as previously described. If multiple racks are positioned in the oven, for example, the lower rack is shielded from the heat of the top plenum by the upper rack and vice versa. By configuring the racks to act as air conduits themselves, for example, or otherwise providing an oven as described herein, this disadvantage is overcome.

As illustrated, the baked product, e.g. personal-sized pan pizza 573, can be on a middle rack and yet impingement heating is easily effected by the fluted conduit network 570 directing impingement air from beneath and above the product. Optionally, the lower impingement flutes may be turned downward to avoid clogging of the orifices with, for example, cheese or other product toppings. In such an instance, rebound plate 670 (FIG. 19) may be positioned beneath product 573 to redirect impingement air 640 toward product 573 in a generally perpendicular orientation. According to the illustrated embodiment, return air 650 flows to an upper portion of the oven and ultimately is returned to source 630.

Figure 22:
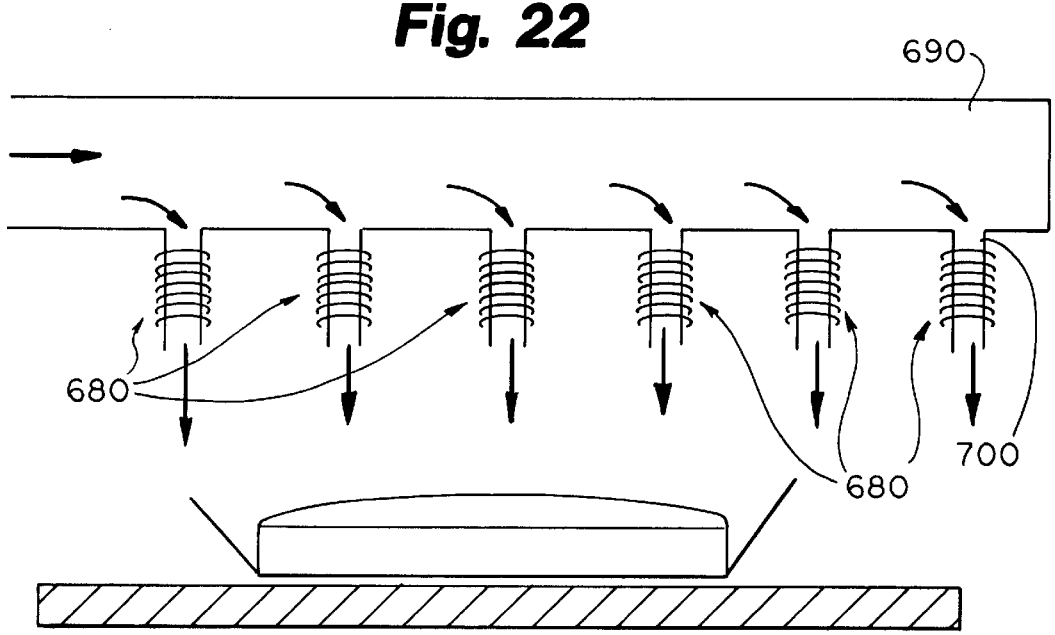
FIG. 22 is a view of an embodiment of the invention depicting individual heating elements in association with heating conduits.

In a further embodiment of the invention, individual heat transfer elements 680 are affixed to each air pipe or conduit 690 in close association with jet nozzles 700, as depicted in FIG. 22. Heat transfer elements 680 may comprise electrical heating coils, for example. Heat transfer elements 680 may run the length of the tubing to improve heat transfer or, alternatively, may be placed inside, next to, or around a portion of the heat transfer conduit, for example, proximal the jet nozzle. In the example of FIG. 22, the same elements supply infrared heat directly to the baked product, increasing overall heat transfer. This embodiment can be used with other above-described embodiments, like that of FIG. 10, for example.

Embodiments described with respect to e.g. FIGS. 10 and 17–22 apply impingement using tubes. This is particularly adaptable to the use of compressed air as a propellant, as referenced above, instead of e.g. large and cumbersome fans and plenum chambers. Accordingly, advantages noted above of the use of compressed air impingement can be exploited to make ovens quieter, more compact, and airflow more uniform and controlled.

While the present invention has been described and illustrated with reference to particular preferred embodiments, the invention is not limited to the specific features and examples given. For example, baking, freezing or drying products other than pizzas or food items, such as drying paper, may benefit from the implementation of impingement heat and mass transfer as herein described. Although the term "air" or "airflow" is used herein, those of ordinary skill will understand that gasses other than air are equally contemplated according to embodiments of the invention. Additionally, combinations of the specified embodiments of the invention may be utilized to increase the advantages of the particular embodiments in any appropriate manner. More specifically, the embodiments shown and described with respect to any one figure can be used with and/or combined with the embodiments of any one or more additional figures. Various other modifications to the invention will occur to those of ordinary skill in the art, and other embodiments and modifications can be made by those skilled in the art without departing from the spirit and scope of the invention.

What is claimed is:

1. A nozzle insert for an impingement oven, the nozzle insert comprising:

an outer shell;

connection structure, operably coupleable with the outer shell, constructed to position the nozzle insert to direct gasflow toward a processing chamber of an impingement oven; and a plurality of conduits disposed within the outer shell, the plurality of conduits being constructed to create a rifling effect on gasflow passing through the plurality of conduits, thereby creating a plurality of gas jets for impinging on a product in the processing chamber.

2. The nozzle insert of claim 1, wherein the outer shell is a generally cylindrical outer shell and the plurality of conduits comprises a plurality of generally cylindrical tubes.

3. The nozzle insert of claim 1, wherein the connection structure is constructed to removably connect the nozzle insert in position within the oven.

4. The nozzle insert of claim 1, wherein the outer shell has an overall length of between about 2 cm and about 5 cm; further wherein the plurality of conduits each have a diameter of between about 0.1 and 0.2 cm.

5. The nozzle insert of claim 1, wherein the nozzle insert creates a pressure differential between a processing-chamber end thereof and an opposite end thereof, the pressure differential being generally the same as that created by a single conduit having a length up to about 12 times longer than the outer shell and having a diameter up to about 10 times the diameter of the plurality of conduits.

6. The nozzle insert of claim 1, wherein the connection structure is constructed to removably connect the nozzle insert to a nozzle of the impingement oven.

7. The nozzle insert of claim 1, wherein the plurality of conduits are generally straight and provide a generally linear gasflow path.

8. The nozzle insert of claim 1, wherein the plurality of conduits are generally curved and provide a generally spiral gasflow path.

9. The nozzle insert of claim 1, wherein the connection structure is constructed to connect the nozzle insert to a plenum of the impingement oven.

10. An impingement oven, the impingement oven comprising a processing chamber and a plurality of nozzle inserts positioned to direct gasflow to the processing chamber, each nozzle insert comprising:

an outer shell;

connection structure, operably coupleable with the outer shell, constructed to position the nozzle insert to direct gasflow toward the processing chamber of the impingement oven; and a plurality of conduits disposed within the outer shell, the plurality of conduits being constructed to create a rifling effect on gasflow passing through the plurality of conduits, thereby creating a plurality of gas jets for impinging on a product in the processing chamber.

11. An impingement oven, the impingement oven comprising:

a source of gas; and a plurality of conduits constructed to direct gas from the source to a processing chamber within the oven, the plurality of conduits further being constructed to direct impinging gas to a product within the processing chamber, the plurality of conduits terminating at the processing chamber at different distances from the source; the plurality of conduits each having generally the same length.

12. The impingement oven of claim 11, wherein at least one of the conduits folds back on itself between the source and the processing chamber.

13. The impingement oven of claim 11, further comprising a plurality of return conduits constructed to direct return gas from the processing chamber to the source, the return conduits originating at the processing chamber at different distances from the source, the return conduits each having generally the same length.

14. The impingement oven of claim 13, wherein at least one of the return conduits folds back on itself between the processing chamber and the source.

15. The impingement oven of claim 11, further comprising at least one nozzle insert, in fluid communication with at least one of the conduits, the at least one nozzle insert being positioned to direct gasflow to the processing chamber, the at least one nozzle insert comprising:

an outer shell;

connection structure, operably coupleable with the outer shell, constructed to position the nozzle insert to direct gasflow toward the processing chamber of the impingement oven; and a plurality of subconduits disposed within the outer shell, the plurality of subconduits being constructed to create a rifling effect on gasflow passing through the plurality of subconduits, thereby creating a plurality of gas jets for impinging on the product within the processing chamber.

16. An impingement oven, comprising:

a processing chamber;

first structure at the processing chamber for directing impinging gas to a product in the processing chamber;

second structure at the processing chamber for directing impinging gas to the product in the processing chamber;

a gas source in fluid communication with the first and second structures;

conduits for directing gas from the gas source to the first structure and the second structure; and a gas fluctuation device, operably coupled with the conduits, for alternately channeling gas either to the first structure or to the second structure.

17. The impingement oven of claim 16, wherein the first structure comprises a plurality of nozzles of the impingement oven.

18. The impingement oven of claim 17, wherein the plurality of nozzles are a plurality of first nozzles; further wherein the second structure comprises a plurality of second nozzles of the impingement oven.

19. The impingement oven of claim 18, wherein the second nozzles are disposed on an opposite side of the processing chamber from the first nozzles.

20. The impingement oven of claim 16, wherein the first structure comprises a plenum plate of the impingement oven.

21. The impingement oven of claim 20, wherein the second structure comprises said plenum plate or an additional plenum plate of the impingement oven.

22. The impingement oven of claim 16, wherein the first structure comprises a plurality of first nozzles and the second structure comprises a plurality of second nozzles, the first nozzles being interspersed with the second nozzles.

23. The impingement oven of claim 16, wherein the first and/or second structure comprises at least one nozzle insert, in fluid communication with at least one of the conduits, the at least one nozzle insert being positioned to direct gasflow to the processing chamber, the at least one nozzle insert comprising:

an outer shell;

connection structure, operably coupleable with the outer shell, constructed to position the nozzle insert to direct gasflow toward the processing chamber of the impingement oven; and a plurality of subconduits disposed within the outer shell, the plurality of subconduits being constructed to create a rifling effect on gasflow passing through the plurality of subconduits, thereby creating a plurality of gas jets for impinging on the product within the processing chamber.

24. The impingement oven of claim 16, wherein the gas source comprises a source of compressed air.

25. The impingement oven of claim 16, wherein the gas fluctuation device comprises a shutter, the shutter moving to a first position to direct gas to the first structure and moving to a second position to direct gas to the second structure.

26. The impingement oven of claim 25, wherein the shutter comprises a pivoted flap.

27. The impingement oven of claim 25, wherein the shutter defines at least one aperture therethrough for allowing gas to flow alternately to the first structure and the second structure.

28. The impingement oven of claim 27, wherein the shutter defines a generally circular shape and defines a plurality of apertures disposed therethrough; the oven further comprising a shutter plate operably connected to the shutter, rotation of the shutter plate with respect to the shutter allowing gas to flow through the apertures alternately to the first structure and the second structure.

29. The impingement oven of claim 25, wherein the shutter is constructed for linear movement between the first and second positions.

30. The impingement oven of claim 16, wherein the gas fluctuation device comprises at least one reciprocating piston in fluid communication with at least one of the conduits.

31. The impingement oven of claim 16, wherein the conduits comprise a first conduit in fluid communication with the first structure and a second conduit in fluid communication with the second structure, further wherein the gas fluctuation device comprises a first reciprocating piston in fluid communication with the first conduit, and a second reciprocating piston in fluid communication with the second conduit.

32. The impingement oven of claim 31, wherein the first and second structure comprise a plurality of nozzles.

33. The impingement oven of claim 31, further comprising a plurality of valves, in fluid communication with the first and second conduits, for aiding the gas fluctuation device.

34. The impingement oven of claim 16, wherein the conduits comprise at least one first conduit constructed to direct gas from the source toward the processing chamber and at least one second conduit constructed to direct gas from the processing chamber toward the source; further wherein the gas fluctuation device reverses gasflow within the oven such that the first conduit also directs gas from the processing chamber toward the source and such that the second conduit also directs gas from the source toward the processing chamber.

35. The impingement oven of claim 16, wherein the conduits terminate at the processing chamber at different distances from the source; the plurality of conduits each having generally the same length.

36. An impingement oven, comprising:
a processing chamber;
first means at the processing chamber for directing impinging gas to a product in the processing chamber;
second means at the processing chamber for directing impinging gas to the product in the processing chamber;
means for providing a source of gas;
means for directing gas from the means for providing to the first means and the second means; and
means for alternately channeling gas either to the first means or to the second means.

37. An impingement oven, comprising:
a processing chamber;
a gas source;
an input channel for directing gas from the source toward the processing chamber; and
a return channel for directing gas from the processing chamber toward the source;
wherein at least one of the input channel and the output channel are constructed to support a product to be processed by the oven in the processing chamber.

38. The impingement oven of claim 37, wherein the processing chamber is constructed to accommodate multiple products top-to-bottom within the processing chamber.

39. The impingement oven of claim 38, further comprising multiple input channels disposed directly above and directly below each product within the processing chamber.

40. The impingement oven of claim 37, wherein the product is supported on the output channel.

41. The impingement oven of claim 37, further comprising structure to reverse the flow of gas in the input channel and the output channel, such that the input channel directs gas from the processing chamber toward the source and the return channel directs gas from the source toward the processing chamber.

42. The impingement oven of claim 41, wherein the gas source comprises a compressed gas source; further wherein the structure to reverse comprises at least one valve associated with the compressed gas source.

43. An impingement oven, comprising:
a processing chamber for accommodating a product to be processed by the oven;
a gas source;
an input channel for directing gas from the source toward the processing chamber; and
a return channel for directing gas from the processing chamber toward the source;
the input channel and the return channel comprising tubes disposed within the processing chamber in fluid communication with the product.

44. The impingement oven of claim 43, further comprising structure to reverse the flow of gas in the input channel and the output channel, such that the input channel directs gas from the processing chamber toward the source and the return channel directs gas from the source toward the processing chamber.

45. The impingement oven of claim 43, wherein the input channel comprises at least one nozzle aimed toward the product for directing gas toward the product; further wherein the return channel comprises at least one aperture aimed away from the product for receiving return air from the processing chamber.

46. The impingement oven of claim 45, wherein both the input channel and the return channel are disposed above the product.

47. The impingement oven of claim 43, wherein the input channel is disposed below the product and comprises at least one nozzle aimed away from the product.

48. The impingement oven of claim 47, further comprising a second input channel disposed above the product, the second input channel comprising at least one nozzle aimed toward the product.

49. The impingement oven of claim 47, further comprising a rebound plate for receiving and reflecting gas received from the at least one nozzle.

50. The impingement oven of claim 44, wherein the gas source is a compressed gas source.

51. The impingement oven of claim 43, wherein the input channel comprises at least one nozzle, the oven further comprising a heating element disposed around the at least one nozzle for improving heat transfer within the oven.

52. The impingement oven of claim 51, wherein the heating element comprises an electric coil.

53. The impingement oven of claim 51, wherein the heating element comprises an infrared heating element.

54. The impingement oven of claim 43, wherein the oven comprises two input channels disposed within the processing chamber for directing gas toward the product at different distances from the source; the two input channels each having generally the same length.

55. The impingement oven of claim 54, wherein one of the input channels folds back upon itself.

56. The impingement oven of claim 43, wherein at least one of the input channel and the return channel contacts the product.

57. The impingement oven of claim 16, further comprising structure for producing low-frequency vibration of the gas flow.

58. The impingement oven of claim 43, further comprising nozzles disposed within the processing chamber, the nozzles being in fluid communication with the tubes.

59. An impingement oven, comprising:

a processing chamber for accommodating a product to be processed by the oven;

a gas source;

an input tube disposed at least partially within the processing chamber for directing gas from the source to the processing chamber; and a return tube disposed at least partially within the processing chamber for directing gas from the processing chamber to the source.

60. The impingement oven of claim 59, further comprising a plurality of nozzles connected to the input tube and to the return tube for directing gas toward or away from the product.

61. The impingement oven of claim 59, further comprising structure to reverse the flow of gas in the input tube and the return tube, such that the input tube directs gas from the processing chamber to the source and the return tube directs gas from the source to the processing chamber.

* * * * *

UNITED STATES PATENT AND TRADEMARK OFFICE
CERTIFICATE OF CORRECTION

PATENT NO. : 6,320,165 B1
DATED : November 20, 2001
INVENTOR(S) : David Z. Ovadia It is certified that error appears in the above-identified patent and that said Letters Patent is hereby corrected as shown below:

<u>Title page,</u>
Item [56], References Cited, U.S. PATENT DOCUMENTS, the following two patents should be listed:

-- 4,834,063    5/1989      Hwang, et al.
5,826,496       10/1998     Jara --

Item [56], References Cited, OTHER PUBLICATIONS, "Sherif" should be
-- Sheriff --.

Signed and Sealed this

Twenty-seventh Day of August, 2002

*Attest:*

*Attesting Officer*

JAMES E. ROGAN
*Director of the United States Patent and Trademark Office*